US010201808B2

(12) United States Patent
Kataoka

(10) Patent No.: US 10,201,808 B2
(45) Date of Patent: Feb. 12, 2019

(54) METHOD FOR PREVENTING A PHOTOCATALYST FROM DECREASING IN HYDROPHILICITY

(75) Inventor: Kenji Kataoka, Yokkaichi (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 706 days.

(21) Appl. No.: 13/811,085

(22) PCT Filed: Jul. 22, 2011

(86) PCT No.: PCT/JP2011/066687
§ 371 (c)(1), (2), (4) Date: Mar. 13, 2013

(87) PCT Pub. No.: WO2012/011560
PCT Pub. Date: Jan. 26, 2012

(65) Prior Publication Data

US 2013/0209809 A1 Aug. 15, 2013

(30) Foreign Application Priority Data

Jul. 23, 2010 (JP) ................................ 2010-165477

(51) Int. Cl.

*B01J 33/00* (2006.01)
*B01J 35/00* (2006.01)
*B01J 37/02* (2006.01)
*C03C 17/32* (2006.01)
*E04B 1/66* (2006.01)

(52) U.S. Cl.

CPC ............ *B01J 33/00* (2013.01); *B01J 35/004* (2013.01); *B01J 37/0209* (2013.01); *B01J 37/0215* (2013.01); *C03C 17/326* (2013.01); *E04B 1/66* (2013.01); *B01J 35/0013* (2013.01); *Y10T 428/31511* (2015.04)

(58) Field of Classification Search

CPC .... B01J 33/00; B01J 37/0029; B01J 37/0215; B01J 35/004; B01J 35/0013; E04B 1/66; C03C 17/326; Y10T 428/31511

USPC ................................................ 427/160–169

See application file for complete search history.

(56) References Cited

U.S. PATENT DOCUMENTS 5,508,325 A * 4/1996 Craun ................ C09D 133/064 523/403
2003/0165693 A1* 9/2003 Hartig ..................... C03C 17/36 428/426
2004/0032655 A1* 2/2004 Kikuchi ................. B60R 1/088 359/444
2005/0267251 A1* 12/2005 Iwakiri .................. C03C 17/30 524/556
2008/0217617 A1 9/2008 Sugawa et al.

FOREIGN PATENT DOCUMENTS

| | | |
|---|---|---|
| JP | H8-302856 | 11/1996 |
| JP | H10-205013 | 8/1998 |
| JP | 2000-063703 A | 2/2000 |
| JP | 2000-136321 A | 5/2000 |
| JP | 2001-064625 A | 3/2001 |
| JP | 2001-064683 A | 3/2001 |
| JP | 2002-167871 | 6/2002 |
| JP | 2003-268350 A | 9/2003 |
| JP | 2004-156023 A | 6/2004 |
| JP | 2004-300863 A | 10/2004 |
| JP | 2006-104249 A | 4/2006 |
| JP | 2007-039548 A | 2/2007 |
| TW | 337533 | 8/1998 |
| TW | 201000564 | 1/2010 |

OTHER PUBLICATIONS

Sigma-Aldrich ( http://www.sigmaaldrich.com/materials-science/material-science-products.html?TablePage=16372116 , accessed online Sep. 16, 2015 ).*

* cited by examiner

*Primary Examiner* — Michael P Wieczorek
*Assistant Examiner* — Michael G Miller
(74) *Attorney, Agent, or Firm* — Jeffrey S. Melcher; Manelli Selter PLLC

(57) ABSTRACT

Disclosed is a method for preventing a photocatalyst from decreasing in hydrophilicity due to contamination by components seeping from a sealing material for anchoring a construction material, exterior material, glass structure, or other article on which a photocatalyst layer is formed. In said method, a transparent sealing-material-component seepage-prevention layer, which contains a modified epoxy resin comprising polymerizable unsaturated monomers graft-polymerized onto or copolymerized with an epoxy resin, is formed on the surface of the sealing material. Said polymerizable unsaturated monomers include a carboxyl-group-containing monomer, and a modified epoxy resin obtained by a carboxyl-group/epoxy-group reaction after graft polymerization or copolymerization is more favorable.

8 Claims, No Drawings

METHOD FOR PREVENTING A PHOTOCATALYST FROM DECREASING IN HYDROPHILICITY

This application is the national phase of international application PCT/JP2011/066687 filed 22 Jul. 2011 which designated the U.S.

TECHNICAL FIELD

The present invention relates to a method for preventing a photocatalyst from decreasing in hydrophilicity caused by bleeding of a sealant component. The present invention also relates to a treatment method for forming a layer for preventing a photocatalyst from decreasing in hydrophilicity caused by the bleeding of a sealant component. Further, the present invention relates to articles, particularly construction materials, exterior materials, and glass structures subjected to the treatment. Moreover, the present invention relates to a transparent composition for preventing a photocatalyst from decreasing in hydrophilicity, which composition is used in the method.

BACKGROUND ART

A photocatalyst layer is formed on a surface of a construction material, glass, or the like, and irradiated with ultraviolet light or visible light. Then, the photocatalyst is excited to decompose or remove an organic substance or demonstrate hydrophilicity, anti-fogging properties, dirt resistance, and the like. When the surface of a construction material, glass, or the like is hydrophilic, a contact angle made with water becomes smaller, and water droplets adhering to the surface spread to form a water film. Thereby, fading of the surface coating by the water droplets can be prevented, or fogging caused by adhesion of fine water droplets can be prevented which improves visibility. Even if dirt adheres to the surface of a construction material, glass, or the like, the hydrophilic effect of the photocatalyst allows water such as rain water to invade under the dirt and remove the dirt. Thereby, the dirt is easily washed off, and a dirt resistance effect is provided. Further, various applications are found, for example, a water film is formed on wall surfaces by the photocatalytic hydrophilicity in summer, thereby the wall is cooled and the room temperature is controlled.

Conventionally, in fixing the construction material, glass, or the like, a sealant is used in a connected portion (joint portion) of the construction materials or a gap between glass and a frame (a sash portion) mainly in order to prevent invasion of rain water or absorb expansion or shrinkage of the construction materials, glass, and the like caused by an external stress. Examples of the sealant include mainly four sealants such as silicone sealants, modified silicone sealants, polysulfide sealants, and polyurethane sealants. A photocatalyst layer is contaminated by bleeding of a plasticized component contained in all of these sealants and becomes water repellant condition and difficult to demonstrate the photocatalytic hydrophilic effect. For this reason, according to the description of Patent Literature 1, in order to prevent elution of a plasticized component contained in a sealant, a fluorine resin coating film, a silicone resin coating film, a modified silicone resin coating film, a polysulfide resin coating film, or a polyisobutylene resin coating film is formed on the surface of the sealant.

CITATION LIST

Patent Literature

Patent Literature 1: JP 2004-300863 A

SUMMARY OF THE INVENTION

Technical Problem

In Patent Literature 1, the fluorine resin coating film, the silicone resin coating film, the modified silicone resin coating film, the polysulfide resin coating film, or the polyisobutylene resin coating film is formed as the layer for preventing elution of the sealant component. The elution preventing effect of the resin coating film is reduced by use for a long time, and the sealant component gradually bleeds out. Thereby, the photocatalyst is contaminated to decrease photocatalytic hydrophilicity.

Solution to Problem

The present inventors conducted research about various resins having a long-term effect of preventing the bleeding of the plasticized component contained in the sealant or the like, and found out that a modified epoxy resin prepared by graft polymerizing or copolymerizing a polymerizable unsaturated monomer with an epoxy resin has a high bleeding preventing effect. Thus, the present invention has been completed.

Namely, the present invention is a method for preventing a photocatalyst from decreasing in hydrophilicity comprising the step of forming a transparent preventing layer on a surface of a sealant which fixes (seals) an article, the article has the photocatalyst layer formed on at least a part of a surface of the article, and the transparent preventing layer comprises a modified epoxy resin prepared by graft polymerizing or copolymerizing a polymerizable unsaturated monomer with an epoxy resin and prevents a sealant component from bleeding out from the sealant.

Moreover, the present invention is a method for treating an article comprising the steps of forming a photocatalyst layer on at least a part of a surface of the article fixed (sealed) by a sealant, and forming a preventing layer on a surface of the sealant, the preventing layer prevents a sealant component from bleeding out from the sealant. Particularly, the present invention is a method for treating a glass structure comprising a gap between a glass and a frame which is filled with a sealant comprising the steps of forming a photocatalyst layer on at least a part of a surface of the glass, and forming a preventing layer on a surface of the sealant, the preventing layer prevents a sealant component from bleeding out from the sealant.

Moreover, the present invention is an article comprising a photocatalyst layer on at least a part of a surface of the article, a sealant which fixes (seals) the article, and a transparent preventing layer on a surface of the sealant, the preventing layer prevents a sealant component from bleeding out from the sealant, and particularly a glass structure comprising a gap between a glass and a frame which is filled with a sealant, the glass structure further comprises a photocatalyst layer on at least a part of a surface of the article, and a transparent preventing layer on a surface of the sealant, the preventing layer prevents a sealant component from bleeding out from the sealant.

Further, the present invention is a transparent composition for preventing a photocatalyst from decreasing in hydrophilicity comprising a modified epoxy resin prepared by graft polymerizing or copolymerizing a polymerizable unsaturated monomer with an epoxy resin.

Advantageous Effects of Invention

The present invention is a method comprising the step of forming a transparent preventing layer on a surface of a sealant which fixes (seals) an article, the article has a photocatalyst layer formed on at least a part of a surface of the article, and the transparent preventing layer comprises a modified epoxy resin prepared by graft polymerizing or copolymerizing a polymerizable unsaturated monomer with an epoxy resin, and prevents a sealant component from bleeding out from the sealant. Thereby, bleeding of the sealant can be prevented, and the photocatalytic hydrophilicity can be kept for a long time. Moreover, the layer for preventing a sealant component from bleeding out is suitable for transparent articles such as a glass structure because the layer has transparency even at the thickness of the film is thick.

Moreover, the present invention is a method comprising the steps of forming a photocatalyst layer on at least a part of a surface of the article which is fixed (sealed) by a sealant, and forming a preventing layer on a surface of the sealant, the preventing layer prevents a sealant component from bleeding out from the sealant. Thereby, the photocatalyst layer and the layer for preventing a sealant component from bleeding out can be formed in a worksite in which the article is constructed.

Moreover, the present invention is an article comprising a photocatalyst layer on at least a part of a surface of the article, a sealant which fixes (seals) the article, and a preventing layer on a surface of the sealant, the preventing layer prevents a sealant component from bleeding out from the sealant. Thereby, the photocatalytic hydrophilicity can be kept for a long time. Thereby, fading of the surface coating by the water droplets can be prevented for a long time, and fogging caused by adhesion of fine water droplets can be prevented for a long time to secure visibility. Moreover, a dirt resistance effect to facilitate washing off the dirt on the surface of the article and a room temperature control function can be given to the article for a long time.

Further, the present invention is a transparent composition for preventing a photocatalyst from decreasing in hydrophilicity, comprising a modified epoxy resin prepared by graft polymerizing or copolymerizing a polymerizable unsaturated monomer with an epoxy resin.
The composition can be coated to a photocatalytic article newly provided and a photocatalytic article already provided, and can be used to prevent decrease in the photocatalytic hydrophilicity.

DESCRIPTION OF EMBODIMENTS

The present invention is a method comprising the step of forming a transparent preventing layer on a surface of a sealant which fixes (seals) an article, the article has a photocatalyst layer formed on at least a part of a surface of the article, and the transparent preventing layer comprises a modified epoxy resin prepared by graft polymerizing or copolymerizing a polymerizable unsaturated monomer with an epoxy resin, and prevents a sealant component from bleeding out from the sealant. A variety of articles can be used as the article. For example, a variety of PC plates, ceramic construction materials, metallic construction materials frequently used to construct architectural structure can be used. Particularly, the construction materials, glass, and the like used for exterior materials for architectural structure can utilize the photocatalytic hydrophilicity, and are preferable. The construction materials, glass, and the like used for interior materials for architectural structure may also be used. A photocatalyst layer is formed on at least a part of the surface of the article. A transparent photocatalyst layer is preferable, since it can be applied to transparent articles such as glass and the applicable articles are not essentially limited. A base layer (first layer) may be formed on the surface of the article in advance, and the photocatalyst layer (second layer) may be formed on the base layer.

A photocatalyst is a particle that demonstrates a photocatalytic property (photocatalytic hydrophilicity) by irradiation with light having energy not less than the bandgap. One or two or more of known metal compound semiconductors such as titanium oxide, zinc oxide, tungsten oxide, iron oxide, and strontium titanate can be used. Particularly, titanium oxide is desirable because titanium oxide has a high photocatalytic property, chemical stability, and no harm. Titanium oxide includes titanium oxide and those generally called hydrous titanium oxide, hydrated titanium oxide, orthotitanic acid, metatitanic acid, and titanium hydroxide. Titanium oxide may have any crystal forms such as an anatase form, a brookite form, and a rutile form, or a mixed crystal forms of these. Further, in order to improve the photocatalytic property, at least one metal selected from the group consisting of elements of V, Fe, Co, Ni, Cu, Zn, Ru, Rh, Pt, Pd, and Ag and/or a compound thereof may be contained inside the particle and/or on the surface of the particle. The photocatalyst has preferably a fine particle size, and has a particle size more preferably in the range of 1 to 500 nm, still more preferably in the range of 1 to 400 nm, and most preferably in the range of 1 to 300 nm from the viewpoint of a high photocatalytic property.

Preferably, the photocatalyst is a titanium oxide having a visible light responsive ability which can be excited by irradiation with the visible light. Natural light contains only several percents of the ultraviolet light that can usually excite titanium oxide. Accordingly, if the photocatalyst has the visible light responsive ability, natural light can be efficiently used to effectively decompose an object to be treated. Known titanium oxide having the visible light responsive ability can be used. For example, titanium oxide particles doped with a different element such as sulfur (S), nitrogen (N) and carbon (C); titanium oxide particles formed a solid solution with different metal ions; titanium oxide particles whose surface carries a halogenated platinum compound or iron oxyhydroxide; titanium oxide particles complexed with a compound that demonstrates photocatalyst activity in the visible light range such as iron oxide and tungsten oxide; and titanium oxide having a varied compositional ratio of titanium and oxygen; can be suitably used.

To form the photocatalyst layer on the surface of the article, the use of a composition containing at least the photocatalyst and a solvent is preferable, and the use of a composition containing at least the photocatalyst, a solvent, and a binder for fixing the photocatalyst is more preferable. As the solvent, aromatic solvents such as toluene and xylene, alcohol solvents such as butanol, isopropyl alcohol, and ethanol, hydrocarbon solvents such as cyclohexane, ethyl acetate, butyl acetate, methyl butyl ketone, or water can be used, for example. As the binder, any of organic binders and inorganic binders can be used. Examples of the organic binders include acrylic resins, epoxy resins, polyester resins, vinyl acetate resins, polyvinyl alcohols, urea resins, phenol resins, fluorinated resins, silicone resins, organopolysiloxanes, polyurethane resins, ultraviolet light curable resins, and electron beam curable resins. Examples of the inorganic binders include water glass, colloidal silica, cement, gypsum, water glass, and porcelain enamel. The photocatalyst, the solvent, and when necessary the binder are mixed by a known method to obtain a composition. The amount of the photocatalyst in the composition is preferably 5 to 98% by weight, more preferably 25 to 98% by weight, still more preferably 30 to 98% by weight, and further still more preferably 40 to 98% by weight. In the case where cement or gypsum is used, the content of the photocatalyst is preferably 5 to 40% by weight, and more preferably 5 to 25% by weight. If the amount of the photocatalyst is less than the range of the lower limit, the photocatalytic property would not be sufficiently obtained. If the amount is more than the range of the upper limit, the photocatalyst would be difficult to disperse. Accordingly, both cases would not be preferable. A dispersant, a dispersion stabilizer, a coupling agent, a curing agent, a crosslinking agent, a polymerization initiator, a viscosity control agent, a thickener and the like may be properly blended into with the composition for forming the photocatalyst layer.

Preferably, the composition for forming the photocatalyst layer is coated or sprayed to the article such as construction materials and glass, and dried at a temperature of approximately 20 to 200° C. to form the photocatalyst layer. When necessary, the composition may be fired at a temperature of approximately 200 to 700° C. The composition for forming the photocatalyst layer can be coated or sprayed by a known method. For example, the composition can be coated by an impregnation method, a dip coating method, a spin coating method, a blade coating method, a roller coating method, a wire bar coating method, a reverse roll coating method, a brush coating method, or sprayed by a method such as a spray coating method. The thickness of the photocatalyst layer can be properly set. In order to secure transparency, the thickness is preferably approximately 0.001 to 1000 μm. The photocatalyst layer may be formed on the layer for preventing a sealant component from bleeding out, or is more preferably formed spaced approximately 1 to 5 mm from the layer for preventing a sealant component from bleeding out.

When positioning and fixing the article, as a sealant for sealing a connected portion (joint portion) between the articles, or a gap between the article and a frame (sash portion), a known sealant can be used (sealing means for shielding from air, water or the like). Examples of the sealant include silicone resins, modified silicone resins, polysulfide resins, and polyurethane resins. Particularly, a two-component sealant using a silicone resin and a curing agent is highly effective. Further, a sealant using an isocyanate compound such as hexamethylene diisocyanate, 4,4'-diphenylmethanediisocyanate, tolylene diisocyanate, xylene diisocyanate, aromatic isocyanate as the curing agent is highly effective.

A transparent layer for preventing a sealant component from bleeding out is formed on the surface of the sealant provided on the article, in which the layer contains a modified epoxy resin prepared by graft polymerizing or copolymerizing a polymerizable unsaturated monomer with an epoxy resin. The layer for preventing a sealant component from bleeding out may contain a transparent modified epoxy resin described later, and additives for a coating material such as a dispersant, a dispersion stabilizer, a coupling agent, a curing agent, a crosslinking agent, a polymerization initiator, a viscosity control agent, thickeners, and a reforming resin. A coloring pigment such aluminum flake is not used, and the layer for preventing a sealant component from bleeding out is prevented from being opaque.

As the epoxy resin used for the transparent modified epoxy resin, ordinary epoxy resins can be used. Epoxy resins having two or more epoxy groups in one molecule and an average epoxy equivalent in the range of approximately 150 to 1,000 are preferable, and epoxy resins having an average epoxy equivalent in the range of approximately 150 to 500 are more preferred. When the epoxy equivalent of the epoxy resin is more than approximately 1,000, solubility of the modified epoxy resin to be obtained in mineral spirit is reduced, or curability is reduced. Accordingly, this case is not preferable. Examples of the epoxy resin can include bisphenol A epoxy resins, bisphenol F epoxy resins, bisphenol AD epoxy resins, epoxy ester resins obtained by modifying the epoxy resins with dibasic acid or the like, alicyclic epoxy resins, polyglycol epoxy resins, and epoxy group containing acrylic resins. Specifically, commercially available products such as DER-331J (made by Dow Chemical Company), EPON #828, 834, and 806H (made by Yuka Shell Epoxy K.K.), GY #260 (made by Asahi Ciba Co., Ltd.), Epomic R #140P (made by MITSUI OIL CO., LTD.), EPOTOHTO YD128 (made by Tohto Kasei Co., Ltd.), ERL-4221 and 4229 (made by Union Carbide Corporation), and Denacol EX-830 (made by Nagase ChemteX Corporation) can be used. The epoxy resin preferably has an average epoxy equivalent in the range of approximately 150 to 1,000 as stated. However, an epoxy resin having an epoxy equivalent around approximately 1,500 may be used as long as the mixture of epoxy resins has the average epoxy equivalent in the range of approximately 150 to 1,000 in total.

Examples of the polymerizable unsaturated monomer used in the transparent modified epoxy resin include carboxyl group containing monomers and other polymerizable unsaturated monomers. Examples of carboxyl group containing monomers can include acrylic acid, methacrylic acid, crotonic acid, itaconic acid, maleic acid, fumaric acid, 2-carboxyethyl (meth)acrylate, 2-carboxypropyl (meth) acrylate, and 5-carboxypentyl (meth)acrylate. Examples of other polymerizable unsaturated monomers include alkyl esters or cycloalkyl esters having 1 to 24 carbon atoms of acrylic acids or methacrylic acids such as methyl (meth) acrylate, ethyl (meth)acrylate, propyl (meth)acrylate, i-propyl (meth)acrylate, n-butyl (meth)acrylate, i-butyl (meth) acrylate, t-butyl (meth)acrylate, hexyl (meth)acrylate, 2-ethylhexyl (meth)acrylate, n-octyl (meth)acrylate, decyl acrylate, stearyl (meth)acrylate, lauryl acrylate, and cyclohexyl (meth)acrylate; alkoxyalkyl esters having 2 to 18 carbon atoms of acrylic acids or methacrylic acids such as methoxybutyl (meth)acrylate, methoxyethyl (meth)acrylate, and ethoxybutyl (meth)acrylate; hydroxyalkyl esters having 2 to 8 carbon atoms of acrylic acids or methacrylic acids such as 2-hydroxyethyl (meth)acrylate, 3-hydroxypropyl (meth)acrylate, and hydroxybutyl (meth)acrylate; styrene, α-methylstyrene, vinyl chloride, and butadiene. From the viewpoint of adhesion to the sealant and drying properties, an alkoxysilyl group containing monomer is suitably used as a copolymerizable component. Examples of the alkoxysilyl group containing monomer include vinyltrimethoxysilane, vinyltriethoxysilane, vinyltris(2-methoxyethoxy)silane, γ-(meth)acryloyloxypropyltrimethoxysilane, vinyltriacetoxysilane, and γ-(meth)acryloyloxypropyltriethoxysilane.

The transparent modified epoxy resin is preferably graft polymerized or copolymerized: for example, the polymerizable unsaturated monomer is mixed in a proportion in the range of 10 to 2,000 parts by weight based on 100 parts by weight of the epoxy resin; and the mixture is subjected to a heat reaction at a temperature in the range of approximately 60 to 150° C. usually for approximately 1 to 10 hours in the presence of a polymerization initiator such as azobisisobutyronitrile and benzoyl peroxide, and preferably a peroxide polymerization initiator such as benzoyl peroxide in order to progress grafting efficiently.

Particularly, in a suitable transparent modified epoxy resin, the polymerizable unsaturated monomer contains a carboxyl group containing monomer, and the transparent modified epoxy resin is obtained by reacting a carboxyl group with the epoxy group after graft polymerization or copolymerization with the epoxy resin. The carboxyl group is reacted with the epoxy group in an equivalent ratio in the range of 1:0.05 to 1:0.5. For example, in the presence of an epoxy group/carboxyl group reaction catalyst, the carboxyl group and the epoxy group are reacted under heating usually for 1 to 10 hours. Examples of the epoxy group/carboxyl group reaction catalyst can include quaternary salt catalysts such as tetraethylammonium bromide, tetrabutylammonium bromide, tetraethylammonium chloride, tetrabutylphosphonium bromide, triphenylbenzylphosphonium chloride; and amines such as triethylamine and tributylamine. The reaction temperature is suitably approximately 120 to 150° C.

To form the layer for preventing a sealant component from bleeding out, a composition containing the aforementioned transparent modified epoxy resin, and when necessary further containing a diluted solvent, a curing agent, a silane coupling agent, an organic tin compound, and the like can be prepared and used. When necessary, additives for a coating material such as a reforming resin, a thickener, and a dispersant can be blended. In order to secure transparency, no coloring pigment such as aluminum flake is used.

As a solvent for diluting the modified epoxy resin, petroleum solvents having a high flash point, a high boiling point, and low pollution properties such as mineral spirit can be used. Examples of the petroleum solvent can include mineral spirit, naphtha, and as commercially available products such as Solvessos 100, 150, and 200 (made by Exxon Chemical Company), Swasols 100, 200, and 310 (made by Maruzen Petrochemical Co., Ltd.), and A Solvent (made by JX Nippon Oil & Energy Corporation) can be mentioned. The solvent having a high flash point of not less than 40° C. is suitably used. These may be used alone or in combination, or these may be used as the main component and a small amount of other solvent may be used in combination. Examples of the other solvent can include hydrocarbon solvents such as toluene, xylene and solvent naphtha; ketone solvents such as methyl ethyl ketone and methyl isobutyl ketone; and ester solvents such as ethyl acetate. The amount of the other solvent to be used can be properly set.

The modified epoxy resin is suitably used in combination with a curing agent for the epoxy resin. The modified epoxy resin and the curing agent for the epoxy resin are prepared as a two-component type in which the modified epoxy resin is placed in one container and the curing agent for the epoxy resin is placed in other container, and these are mixed in use, or a one-component type in which the modified epoxy resin and the curing agent for the epoxy resin are placed in the same container. As the curing agent for the epoxy resin, known curing agents for the epoxy resin having an active hydrogen equivalent in the range of 40 to 300 can be used. Specifically, examples of such a curing agent can include aliphatic polyamines such as meth-xylenediamine, isophoronediamine, diethylenetriamine, triethylenetetramine, and diaminodiphenylmethane; epoxy resin adducts of aliphatic polyamines; ketiminized products; polyamideamines; and polyamide resins. These can be used alone, or two or more thereof can be mixed and used. Among these, polyamide resins modified with a ketiminized dimer acid having a ketiminization rate of not less than 80%, and preferably not less than 90% are suitable for the present invention. At a ketiminization rate of the modified polyamide resin less than 80%, adhesion of the coating film and an extension rate may be insufficient, and is not preferable. Specific examples of the polyamide resins modified with a ketiminized dimer acid include "7A122N90" (made by Henkel Japan Ltd., trade name). In the case of the one-component type, ketiminized polyamines having a ketiminization rate of not less than 80%, and preferably not less than 90% are suitable. Preferable specific examples of ketiminized polyamines include a ketiminized product of aliphatic polyamine "Versamine K13" (made by Henkel Japan Ltd., trade name), and a ketiminized product of JEFFAMINE polyamine "Adeka Hardener EH-235R" (made by Adeka Corporation, trade name). The amount of the ketiminized polyamine can be properly set.

Examples of the silane coupling agent include amino group containing silane coupling agents such as γ-(2-aminoethyl)aminopropyltrimethoxysilane, γ-aminopropyltriethoxysilane, N-(β-aminoethyl)-γ-aminopropyltrimethoxysilane, and N-(β-aminoethyl)-γ-aminopropylmethyldimethoxysilane; glycidyl group containing silane coupling agents such as γ-glycidoxypropyltrimethoxysilane and γ-glycidoxypropylmethyldimethoxysilane; and mercapto group containing silane coupling agents such as γ-mercaptopropyltrimethoxysilane. Polysiloxanes having an amino group can also be used. Further, in the case of the one-component type, ketiminized products of 3(or 2)-triethoxysilyl-N-(1,3-dimethylbutylidene)propylamine and so on may be used.

Among these, usually, the amino group containing silane coupling agent is blended into the curing agent container to increase the crosslinking density and improve adhesion. The glycidyl group containing silane coupling agent is blended into the main base agent container to increase the crosslinking density and improve adhesion. Usually, the mercapto group containing silane coupling agent is blended into the main agent container to contribute to not only improvement in the crosslinking density and adhesion but also control of a pot life after the coupling agent is mixed with the curing agent.

In the case where the amino group containing silane coupling agent is used as the silane coupling agent, the blending ratio is suitably 0.1 to 10 parts by weight based on 100 parts by weight of the solid content of the curing agent. In the case where the glycidyl group containing silane coupling agent and/or the mercapto group containing silane coupling agent is used as the silane coupling agent, the blending ratio of the glycidyl group containing silane coupling agent and that of the mercapto group containing silane coupling agent each are 0.1 to 10 parts by weight based on 100 parts by weight of the resin solid content.

The organic tin compound acts as a condensation catalyst in the case where the modified epoxy resin has an alkoxysilyl group. Examples of the organic tin compound include dibutyltin dilaurate, dibutyltin monoacetate, dibutyltin diacetate, trialkyl tin acetate, dioctyltin dilaurate, dibutyltin dioctate, and dibutyltin dimaleate. Among these, organic tin compounds having a long ester chain can give plastic property. The content of the organic tin compound is suitably in the range of 0.1 to 10 parts by weight based on 100 parts by weight of the resin solid content. At a content less than 0.1 parts by weight, adhesion to the surface of the sealant is reduced, and the case is not desirable.

The layer for preventing a sealant component from bleeding out is preferably formed by coating or spraying the composition containing the modified epoxy resin onto the surface of the sealant of the article such as construction material and glass, and drying the composition at a temperature of approximately 20 to 200° C. When necessary, the composition may be fired at a temperature of approximately 200 to 700° C. The composition can be coated or sprayed by a known method. For example, the composition can be coated by an impregnation method, a dip coating method, a spin coating method, a blade coating method, a roller coating method, a wire bar coating method, a reverse roll coating method, a brush coating method, or sprayed by a method such as a spray coating method. The layer for preventing a sealant component from bleeding out is preferably formed such that the entire surface of the sealant is covered, and more preferably formed so as to extend beyond the surface of the sealant to form an extra preventing layer of approximately 5 to 15 mm around the sealant. The transparent layer for preventing a sealant component from bleeding out is preferable since it can be applied to the transparent articles such as glass, and the applicable articles are not essentially limited. The thickness of the layer for preventing a sealant component from bleeding out can be properly set. In order to secure transparency, the thickness is preferably approximately 0.001 to 1000 μm. A primer layer may be formed on the surface of the sealant in advance, and the layer for preventing a sealant component from bleeding out may be formed on the primer layer.

As the primer layer formed on the surface of the sealant in advance, known resins conventionally used for the primer can be used without particular limitation. Examples of such a resin include moisture curable urethane resins, epoxy resin compositions crosslinked with amine, acrylic resin compositions crosslinked with isocyanate, silicone resins having an end alkoxysilyl group, and these resins partially mixed with a chlorinated polyolefin resin.

Moreover, the present invention is a method for treating an article, comprising the steps of: (1) forming a photocatalyst layer on at least a part of a surface of the article which is fixed (sealed) by a sealant, and (2) forming a transparent layer on a surface of the sealant for preventing a sealant component from bleeding out. Particularly, the present invention is a method for treating a glass structure comprising a gap between a glass and a frame (sash portion) which is filled with a sealant comprising the steps of: (1') forming a photocatalyst layer on at least a part of a surface of the glass, and (2') forming the transparent layer on a surface of the sealant for preventing a sealant component from bleeding out on a surface of the sealant. In the step (1) or (1'), the photocatalyst layer may be formed on the surface of the article by using any method, and preferably using the aforementioned composition for forming the photocatalyst layer. In the step (2) or (2'), the transparent layer for preventing a sealant component from bleeding out is preferably formed using the aforementioned composition containing the transparent modified epoxy resin.

Moreover, as described above, the present invention is an article comprising a photocatalyst layer on at least a part of a surface of the article, a sealant which fixes (seals) the article, and the transparent layer on a surface of the sealant for preventing a sealant component from bleeding out. As the article, a variety of PC plates, ceramic construction materials, metallic construction materials and the like can be used. Particularly, construction materials, glass, and the like used for exterior materials for architectural structure can utilize the photocatalytic hydrophilicity, and are suitable. The construction materials, glass, and the like used for interior materials for buildings may also be used as the article. Moreover, the present invention is a glass structure comprising a gap between a glass and a frame (sash portion) which is filled with a sealant, the glass structure further comprises a photocatalyst layer on at least a part of a surface of the glass, and the aforementioned layer for preventing a sealant component from bleeding out on a surface of the sealant.

Moreover, as described above, the present invention is a transparent composition for preventing a photocatalyst from decreasing in hydrophilicity comprising a modified epoxy resin prepared by graft polymerizing or copolymerizing a polymerizable unsaturated monomer with an epoxy resin. Preferably, the polymerizable unsaturated monomer comprises a carboxyl group containing monomer, and the modified epoxy resin is prepared by reacting the carboxyl group with the epoxy group after graft polymerization or copolymerization. Further, the composition containing the curing agent for the epoxy resin is more preferable.

EXAMPLES

Hereinafter, the present invention will be described more in detail using Examples. In Examples, "parts" and "%" are based on the weight.

Production Example of Acrylic Modified Epoxy Resin 532 parts of mineral spirit and 429 parts of "EPIKOTE828EL" (made by Yuka Shell Epoxy K.K., bisphenol A epoxy resin, epoxy equivalent of 187) were heated to 140° C. under a nitrogen gas flow. A mixture of vinyl monomers and polymerization initiators described below was dropped over 3 hours, and aged for 2 hours after dropping. Next, 0.2 parts of tetraethylammonium bromide was fed, and reacted for approximately 2 hours. When the acid value of the resin reached 0.3 mgKOH/g or less, 157 parts of mineral spirit was added to obtain an acrylic modified epoxy resin solution (Sample A). The resin solution had a non-volatile content of 65% and an epoxy equivalent of 652 (solid content).

(Blending Formula for Mixture of Vinyl Monomers and Polymerization Initiators)

| | |
|---|---|
| Methacrylic acid | 10 parts |
| Styrene | 250 parts |
| Ethyl acrylate | 200 parts |
| i-Butyl methacrylate | 200 parts |
| 2-Ethylhexyl acrylate | 290 parts |
| γ-Methacryloxypropyltrimethoxysilane | 50 parts |
| t-Butylperoxy-2-ethylhexanoate | 80 parts |

Production Example of Transparent Composition for Preventing Photocatalyst from Decreasing in Hydrophilicity The main agent and the curing agent were prepared in a blending composition shown in Table 1. The main agent and the curing agent were mixed such that the ratio of active hydrogen equivalent of curing agent/epoxy equivalent of the main agent was 0.8. Thus, a transparent composition for preventing a photocatalyst from decreasing in hydrophilicity (Sample B) was obtained. In Table 1, (note 1) to (note 6) are as follows.

TABLE 1

| | | |
|---|---|---|
| Main agent | Acrylic modified epoxy resin solution (Sample A) | 100 Parts |
| | TSL8350 (Note 1) | 2 Parts |
| | TSL8380 (Note 2) | 1 Part |
| | A Solvent (Note 3) | 57 Parts |
| Curing agent | 7A122N90 (Note 4) | 17 Parts |
| | TSL8331 (Note 5) | 1 Part |
| | NEOSTANN U-100 (Note 6) | 2 Parts |
| | A Solvent | 20 Parts |

(Note 1) "TSL8350": made by Toshiba Silicone Co., Ltd., trade name, γ-glycidoxyisopropyltrimethoxysilane
(Note 2) "TSL8380": made by Toshiba Silicone Co., Ltd., trade name, γ-mercaptopropyltrimethoxysilane
(Note 3) "A Solvent": made by JX Nippon Oil & Energy Corporation, trade name, petroleum solvent
(Note 4) "7A122N90": made by Henkel Japan Ltd., trade name, ketiminized polyamide curing agent, active hydrogen equivalent = 210, ketiminization rate of 95%, non-volatile content of 90%
(Note 5) "TSL8331": made by Toshiba Silicone Co., Ltd., trade name, γ-aminopropyltrimethoxysilane
(Note 6) "NEOSTANN U-100": made by Nitto Kasei Co., Ltd., dibutyltin dilaurate

Examples 1 and 2

Using Toshiba TOSSEAL 381 (one-component type) and Sunstar PENGUIN Seal 2520 (two-component type) individually, a sealant was molded on a glass plate, and fixed. Next, the sealant was masked, and a photocatalyst coating material (ST-K253, made by Ishihara Sangyo Kaisha, Ltd.) was coated to the surface of the glass. The photocatalyst coating material was dried at normal temperature, and the masking was removed. Then, a transparent composition for preventing a photocatalyst from decreasing in hydrophilicity (Sample B) was coated to the surface of the sealant with a brush, and dried at normal temperature to form a transparent layer for preventing a sealant component from bleeding out. Thus, a glass structure according to the present invention was obtained. The obtained glass structures were Examples 1 and 2, respectively.

Comparative Examples 1 and 3

Glass structures for comparison were obtained in the same manner as in Examples 1 and 2 except that the bleeding preventing layer in Examples 1 and 2 was not formed. The obtained glass structures are Comparative Examples 1 and 3, respectively.

Comparative Examples 2 and 4

Glass structures for comparison were obtained in the same manner as in Examples 1 and 2 except that the bleeding preventing layer was formed using a silicone resin (SR2405, made by Dow Corning Toray Co., Ltd.) instead of the composition (Sample B) in Examples 1 and 2. The obtained glass structures are Comparative Examples 2 and 4, respectively.

Test of Hydrophilicity of Photocatalyst

The glass structures obtained in Examples 1 and 2 and Comparative Examples 1 to 4 were placed in an Accelerated Weathering Tester (QUV, made by Q-Lab Corporation). After a predetermined time had passed, water was sprayed, and the hydrophilic effect of the surface coated with the photocatalyst was observed visually. The hydrophilic effect was determined according to the criterion below:

determination criterion: ○ indicates that the result is good, Δ indicates that water tends to be repelled, and X indicates that water is significantly repelled The result is shown in Table 2. In the case where the layer for preventing a sealant component from bleeding out was not formed, the hydrophilic effect of the photocatalyst was reduced after 72 hours in all of the sealants. In the case where the bleeding preventing layer was formed with the conventional silicone resin, the hydrophilic effect of the photocatalyst was reduced after 48 hours in the one-component type sealant, and after 144 hours in the two-component type. Meanwhile, in the case where the layer for preventing a sealant component from bleeding out was formed according to the present invention, the hydrophilic effect of the photocatalyst was found even after 288 hours in the one-component type, and after 504 hours in the two-component type. Namely, the hydrophilic effect of the photocatalyst could be kept for a long time.

TABLE 2

| Sealant | | Bleeding preventing layer | | Weathering time (hr) 24 | 48 | 72 | 144 | 288 | 504 |
|---|---|---|---|---|---|---|---|---|---|
| Toshiba TOSSEAL 381 (one-component type) | Example 1 | Formed | Sample B | ○ | ○ | ○ | Δ | Δ | X |
| | Comparative Example 1 | Not formed | — | Δ | Δ | X | X | X | X |
| | Comparative Example 2 | Formed | Silicone resin | Δ | X | X | X | X | X |
| Sunstar PENGUIN Seal 2520 (two-component type) | Example 2 | Formed | Sample B | ○ | ○ | ○ | ○ | ○ | ○ |
| | Comparative Example 3 | Not formed | — | Δ | Δ | X | X | X | X |
| | Comparative Example 4 | Formed | Silicone resin | ○ | Δ | Δ | X | X | X |

INDUSTRIAL APPLICABILITY

According to the present invention, a layer for preventing a sealant component from bleeding out which is excellent in adhesion to a variety of sealants is provided, the layer is excellent in workability, properties for preventing bleed and dirt, impact resistance, storage stability, and the like. The present invention can also keep the hydrophilic effect of the photocatalyst for a long time.

The invention claimed is:

1. A method for preventing a photocatalyst layer formed on at least a part of a surface of an article from decreasing in hydrophilicity caused by bleeding of a sealant component from a sealant that fixes the article, comprising the step of:
   - forming a transparent sealant component bleeding out preventing layer on a surface of a sealant such that the entire surface of the sealant is covered,
   - wherein the transparent sealant component bleeding out preventing layer comprises a modified epoxy resin prepared by graft polymerizing or copolymerizing a polymerizable unsaturated monomer with an epoxy resin, wherein the transparent sealant component bleeding out preventing layer, when formed, is spaced approximately 1 to 5 mm from the photocatalyst layer, and prevents the sealant component from bleeding out from the sealant that fixes the article.

2. The method for preventing the photocatalyst layer from decreasing in hydrophilicity according to claim 1, wherein the polymerizable unsaturated monomer comprises a carboxyl group containing monomer, and the modified epoxy resin is prepared by reacting the carboxyl group with the epoxy group after the graft polymerization or the copolymerization.

3. A method for treating an article, comprising the steps of:

forming a photocatalyst layer on at least a part of a surface of the article which is fixed by a sealant, and forming the transparent sealant component bleeding out preventing layer according to claim 1 on a surface of the sealant, the preventing layer prevents a sealant component from bleeding out from the sealant.

4. A method for treating a glass structure comprising a gap between a glass and a frame which is filled with a sealant, comprising the steps of:

forming a photocatalyst layer on at least a part of a surface of the glass, and forming the transparent sealant component bleeding out preventing layer according to claim 1 on a surface of the sealant, the preventing layer prevents a sealant component from bleeding out from the sealant.

5. The method for preventing the photocatalyst layer from decreasing in hydrophilicity according to claim 1, wherein the sealant is selected from the group consisting of a silicone resins, modified silicone resins, polysulfide resins, and polyurethane resins.

6. The method for preventing the photocatalyst layer from decreasing in hydrophilicity according to claim 1, wherein the transparent sealant component bleeding out preventing layer is formed so as to extend beyond the surface of the sealant to form an extra transparent sealant component bleeding out preventing layer of approximately 5 to 15 mm around the sealant.

7. A method for preventing a photocatalyst layer formed on at least a part of a surface of an article from decreasing in hydrophilicity caused by bleeding of a sealant component from a sealant that fixes the article, comprising the steps of:

forming a primer layer on the surface of the sealant, and forming a transparent sealant component bleeding out preventing layer on the primer layer, wherein the transparent sealant component bleeding out preventing layer comprises a modified epoxy resin prepared by graft polymerizing or copolymerizing a polymerizable unsaturated monomer with an epoxy resin, wherein the transparent sealant component bleeding out preventing layer, when formed, is spaced approximately 1 to 5 mm from the photocatalyst layer, and prevents the sealant component from bleeding out from the sealant that fixes the article.

8. The method for preventing the photocatalyst layer from decreasing in hydrophilicity according to claim 1, wherein the sealant is polysulfide resins or polyurethane resins.

* * * * *